Patented Feb. 22, 1927.

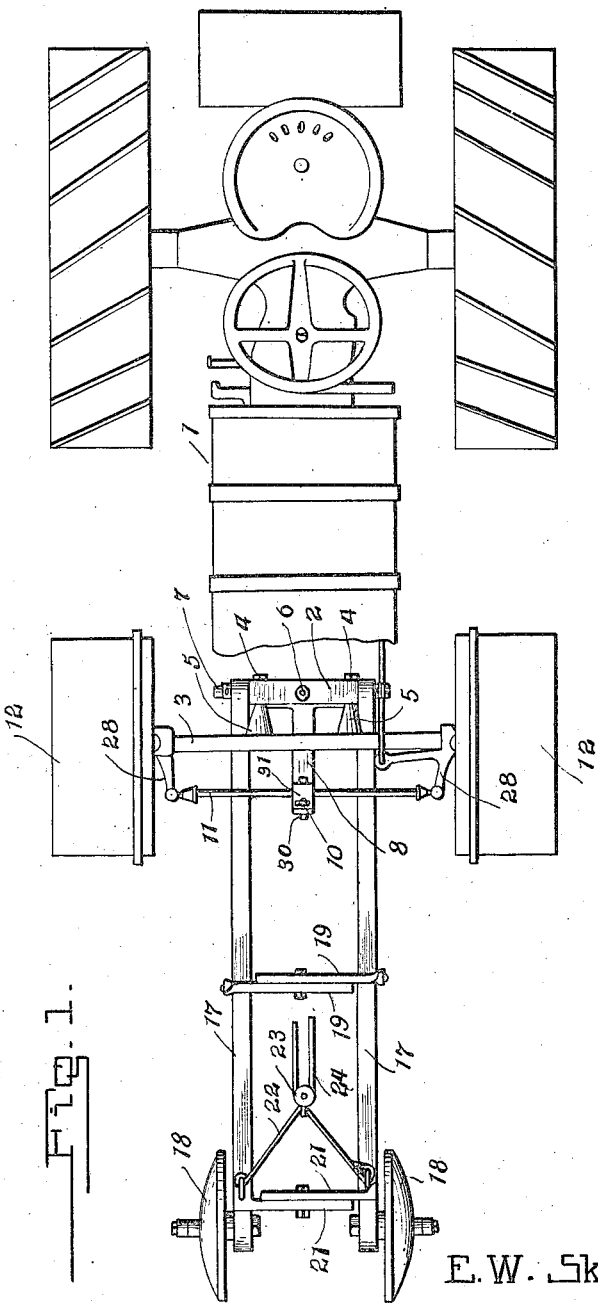

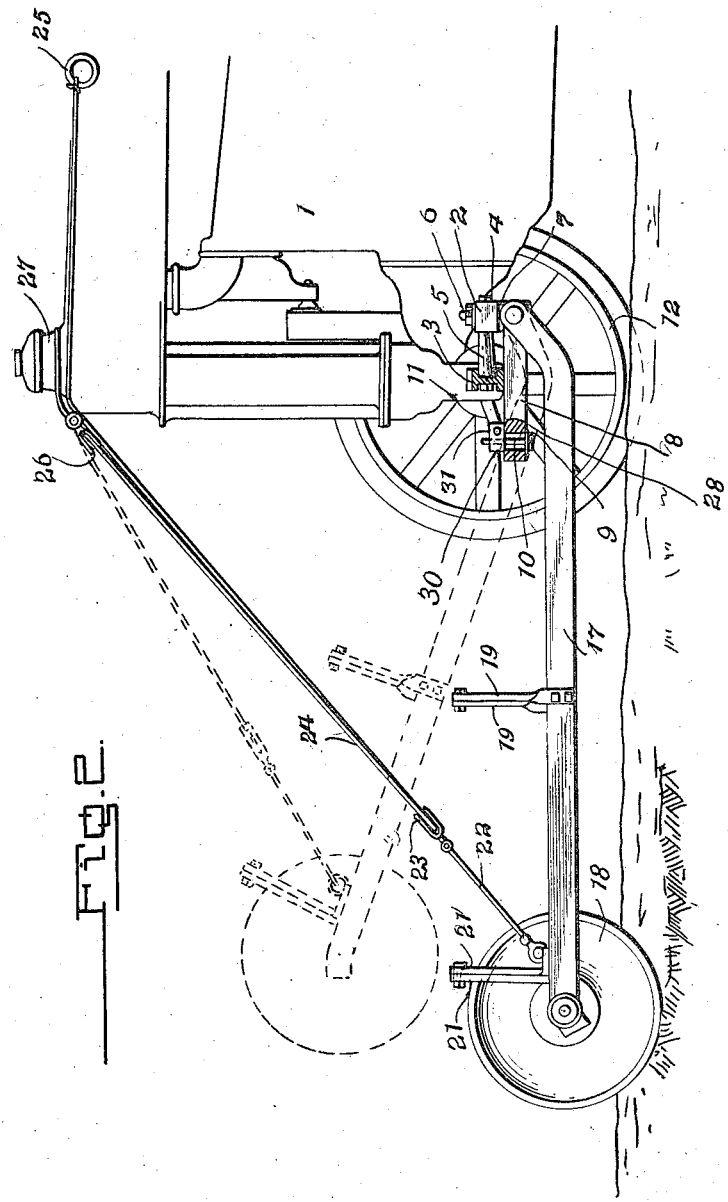

1,618,233

UNITED STATES PATENT OFFICE.

EARL W. SKELTON, OF WAUNETA, NEBRASKA, ASSIGNOR OF ONE-HALF TO GLENN R. KNOTWELL, OF WAUNETA, NEBRASKA.

TRACTOR GUIDE.

Application filed September 1, 1926. Serial No. 133,065.

The object of this invention is to provide an attachment for tractors by the use of which the tractor may be automatically caused to follow a furrow when cultivating cotton or other plants without requiring the close attention of the operator and imposing unnecessary work upon him. The invention seeks to provide an attachment for the stated purpose which is especially adapted to tractors in which the steering mechanism tie-rod is in front of the axle, and which may be readily connected to the steering mechanism of the tractor so that as the machine progresses over a field it will be automatically caused to follow the line of a furrow. Incidental objects of the invention will appear in the course of the following description, and the invention resides in certain novel features which will be particularly pointed out in the appended claim.

The invention is illustrated in the accompanying drawings, in which—

Figure 1 is a plan view of the attachment applied to a tractor, and

Fig. 2 is a side elevation with parts in section.

The tractor, indicated at 1, may be of any well-known type.

The attachment of my invention includes a bar or block 2 which is secured to the rear side of the front axle 3 of the tractor by bolts 4 inserted through the ends of the block and through the axle in an obvious manner, spacing sleeves 5 being fitted around the bolts between the block and the axle so as to maintain the proper relation between the block and the axle. Inserted vertically through the block 2 at the center thereof is a bolt 6 which constitutes a king bolt and upon the lower end of this bolt is pivotally supported a cross bar 7 which constitutes a steering head. Extending forwardly from the cross bar or steering head 7 is a central arm 8 which preferably is integral with the steering head and is provided in its front end portion with a longitudinal slot 9. Fitted slidably through the said slot is a bolt or pin 10 which is secured by a set screw 30 in a block or collar 31, said block or collar being in turn secured to the usual drag link or tie rod 11 of the tractor steering mechanism whereby, if the steering head and the arm be rocked pivotally about the king bolt 6, the drag link will be shifted endwise transversely of the tractor and the steering wheels 12 thereof will be turned in the usual manner. Pivoted upon the ends of the head 7 are the rear ends of steering bars 17 which project downwardly and forwardly and then horizontally forward and carry at their front ends rollers 18 which are preferably in the form of bell drums or casters adapted to run in the furrow and bear against the sides of the same without digging into the soil so that deviation of the furrow from a rectilinear path will cause lateral movement of the wheels and thereby effect horizontal pivotal movement of the steerig head 7 to cause the tractor to automatically follow the line of the furrow in an obvious manner. The arms 17 may be adjusted to any desired points of the cross bar or head 7 so that the device may be easily set to conform to the width of the furrow, and, to maintain the steering bars 17 in parallel relation, I secure to each of said bars between the ends thereof a bracket or bracing member 19 which rises therefrom and then extends inwardly to overlap the similar portion of the member secured to the other bar. The upper inwardly extending portions of the brackets or bracing members are connected by a fastening bolt 20 inserted through alined openings in the two members so as to secure them in a set relation and thereby maintain the bars 17 in parallelism and at the desired distance apart. Similar bars or bracing members 21 are secured to the steering bars adjacent the front extremities thereof.

The pivotal mounting of the steering bars 17 permits them to automatically conform to variations in the depth of the furrow in which they are running and it also facilitates the lifting of the arms into an inoperative position when the tractor is to be turned at the end of a row. To effect the lifting of the steering arms, a bail 22, which may be a rope, is attached to and extends between the front ends of the steering bars, and carried by this bail is a pulley 23 around which is trained a cable 24, one end of the cable extending rearwardly over the tractor and being equipped with a handle 25 of any preferred form whereby it may be conveniently grasped by the operator, and the opposite end of the cable being secured in any desired manner so as to be relatively fixed. An intermediate portion of the cable is preferably trained around a guide pulley 26 which may be conveniently supported over the radiator cap 27 of the tractor.

My improved steering attachment is designed more particularly for use in cultivating listed corn, and in operation the wheels 18 will run in the furrow, as shown in Fig. 2 of the drawings, the tractor wheels running upon the ridges between the furrows, as will be understood upon reference to Fig. 2. When thus arranged, the forward travel of the tractor will, of course, cause the steering attachment to travel in the furrow and any lateral deformations in the side walls of the furrow will act upon the wheels 18 to cause lateral shifting of the same, which shifting will be transmitted to the steering wheels of the tractor in an obvious manner. It will be readily noted that I have provided a very simple and inexpensive attachment which may be easily secured to any known tractor and easily adjusted to the width of the furrow. The operator of the tractor is relieved of the necessity of closely watching the progress of the machine inasmuch as it will be automatically held to the line of the furrow and when the end of a furrow has been reached a pull upon the cable 24 will lift the steering attachment, as indicated by dotted lines in Fig. 2, so that the tractor may then be turned through the usual manipulation of the tractor steering gear. By the use of this steering attachment, the wheels of the tractor will be kept on the ridges when cultivating any row crop planted in trenches, and will also be effectually guided when used with a lister in breaking ridges. In actual practice, the distance from the coupling 31 to the king bolt 6 is twice the length of the spindle arm 28 so that the front tractor wheels turn at about double the angle of the steering bars 17. The dip or bend at the rear ends of the steering bars avoids interference with the axle and the tie-rod when the steering disks 18 are to be raised.

Having thus described the invention, I claim:

A steering attachment for tractors comprising a base block to be secured to the rear side of the front axle of the tractor, a steering head pivotally supported by said base block and having a central stem projecting forwardly under the axle, a coupling on the tie-rod of the tractor steering mechanism, a sliding pivotal connection between said coupling and the front end of the stem, steering bars pivoted at their rear ends upon the ends of the steering head and projecting downwardly and then forwardly under and beyond the axle, and steering wheels carried by the front ends of said bars to run in a furrow.

In testimony whereof I affix my signature.

EARL W. SKELTON. [L. S.]